United States Patent [19]

Okuda

[11] 4,287,542
[45] Sep. 1, 1981

[54] RECORDING AND REPRODUCING DEVICE

[75] Inventor: Hiroshi Okuda, Yokohama, Japan

[73] Assignee: Sony Corporation, Tokyo, Japan

[21] Appl. No.: 73,103

[22] Filed: Sep. 6, 1979

[30] Foreign Application Priority Data

Sep. 8, 1978 [JP] Japan .................................. 53-109785

[51] Int. Cl.³ .......................... G11B 5/54; G11B 15/10
[52] U.S. Cl. ....................................... 360/105; 360/90
[58] Field of Search ................ 360/105, 90, 96.1–96.2, 360/96.4; 242/197–200, 206, 208, 209–210

[56] References Cited

U.S. PATENT DOCUMENTS

| | | | |
|---|---|---|---|
| 3,695,552 | 10/1972 | Guyton et al. ....................... | 360/96.4 |
| 3,819,128 | 6/1974 | Hori et al. ............................. | 360/105 |
| 3,821,810 | 6/1974 | Maruyama ........................... | 360/96.2 |
| 3,887,943 | 6/1975 | Katsurayama ....................... | 360/105 |
| 4,101,941 | 7/1978 | Tanaka ................................. | 360/96.4 |
| 4,106,064 | 8/1978 | Hoshido ............................... | 360/105 |
| 4,142,217 | 2/1979 | Laufer .................................. | 360/96.4 |
| 4,176,383 | 11/1979 | Suzuki ................................. | 360/105 |

Primary Examiner—Alfred H. Eddleman
Attorney, Agent, or Firm—Lewis H. Eslinger; Alvin Sinderbrand

[57] ABSTRACT

In a recording and reproducing device of the type using depressible push buttons to activate different modes of operation there is provided a reproduction actuator lever, a lock lever to keep the actuator lever in its operative position, a head support plate movable in response to movement of the actuator lever, a recording actuator lever, and a swingable lever to lock the recording actuator lever. The swingable lever is normally forced to a position engaged with the recording actuator lever and a swingable member is provided to move the reproduction actuator lever during operation of the recording actuator lever so that during the recording mode the recording lever is held in its operative position by engagement of the swingable lever with the reproduction actuator lever which is locked by the lock lever. During the reproducing mode, the swingable member is liberated so that no force is applied to the recording actuator lever even though the reproduction actuator lever is operated whereby the recording mode can be initiated by a single operation of the recording actuator lever.

4 Claims, 6 Drawing Figures

RECORDING AND REPRODUCING DEVICE

BACKGROUND OF THE INVENTION

1. Field of the Invention

This invention relates generally to recording and reproducing devices such as tape recorders and, more particularly, is directed to such devices wherein selected modes of operation are achieved by selective depression of mode selecting push buttons which activate mode changing mechanisms within the device.

2. Description of the Prior Art

Recording and reproducing devices such as tape recorders of the cassette type have been provided where selected modes of operation such as recording, reproducing, rewind and the like are initiated by depressing a control push button which initiates the desired response. Devices of this type often require that two or more different push buttons be depressed to initiate certain modes of operation. Such a necessity often makes use of such recording and reproducing devices needlessly complex and difficult to use with facility.

OBJECTS AND SUMMARY OF THE INVENTION

Accordingly, it is an object of the present invention to provide a recording and reproducing device where various operating modes of the device can be initiated by the selective depression of a single operating push button corresponding to the desired mode of operation.

More specifically, it is an object of the invention to provide an operating mechanism for a recording and reproducing device where an operating mode may be selected and initiated by the depression of a single mode selecting push button wherein the mechanism is improved in operability and reliability over prior art devices.

In accordance with an aspect of this invention an improved recording and reproducing device is provided comprising a reproduction actuator lever, a lock lever for keeping the actuator lever in its operative position, a head support plate movable in accordance with operation of the actuator lever, a recording actuator lever, a locking swingable lever forced to its position on the recording actuator lever by a spring, a swingable member for moving the reproduction actuator lever by the operation of the recording actuator lever a rewind lever, and an acting element provided at an end of the rewind lever so as to confront the locking swingable lever. In operation, during a recording operation mode the recording actuator lever is held at its operative position by engaging the swingable lever with the reproduction actuator lever which has been locked by the lock lever, and during the rewind mode the swingable lever is moved by the acting element to allow the recording actuator lever alone to return to its inoperative position to form a review mode. According to an aspect of this invention, it is possible to switch from the recording mode into the review mode or reproduction mode by a single operation.

The above, and other objects, features and advantages of this invention, will be apparent in the following detailed description of an illustrative embodiment which is to be read in connection with the accompanying drawings.

DETAILED DESCRIPTION OF A PREFERRED EMBODIMENT

Figure 1:
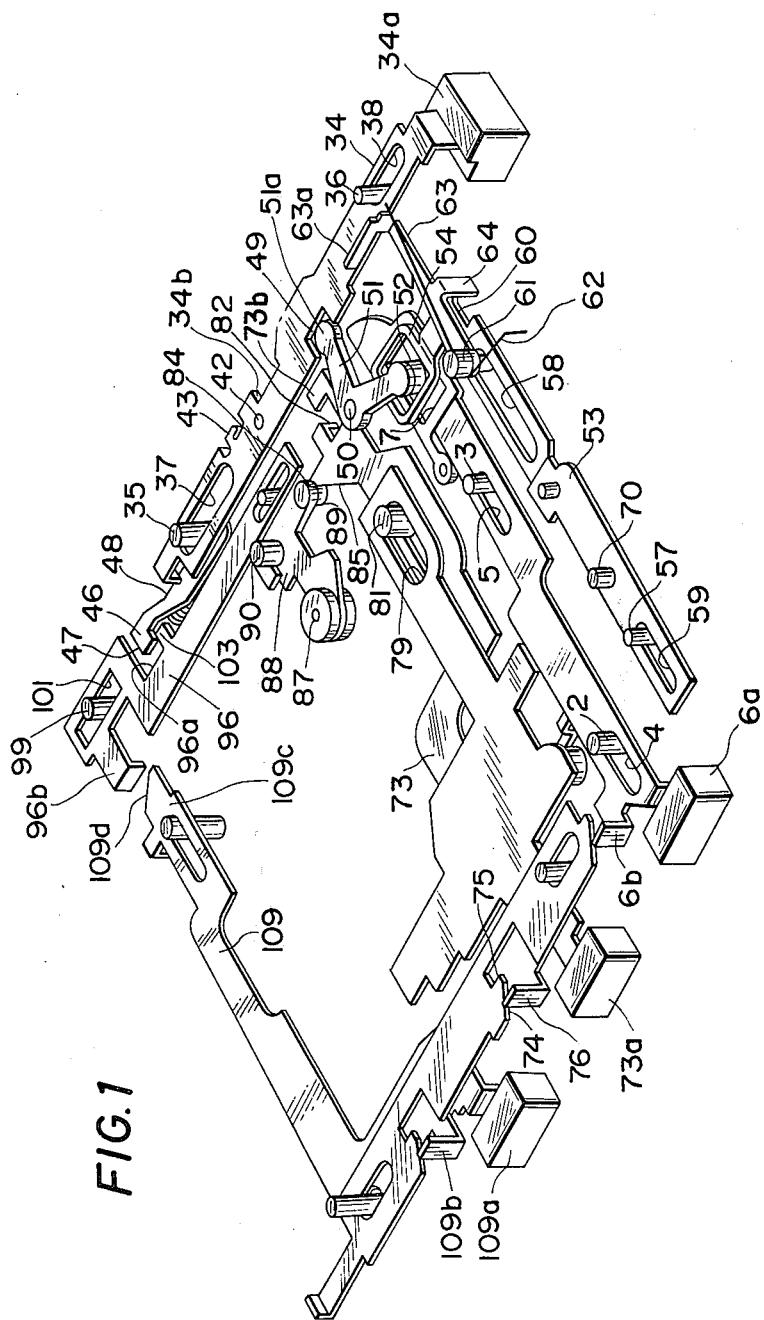
FIG. 1 is a perspective view of the principal operating mechanism of the present invention used in a recording and reproducing device.
Figure 2:
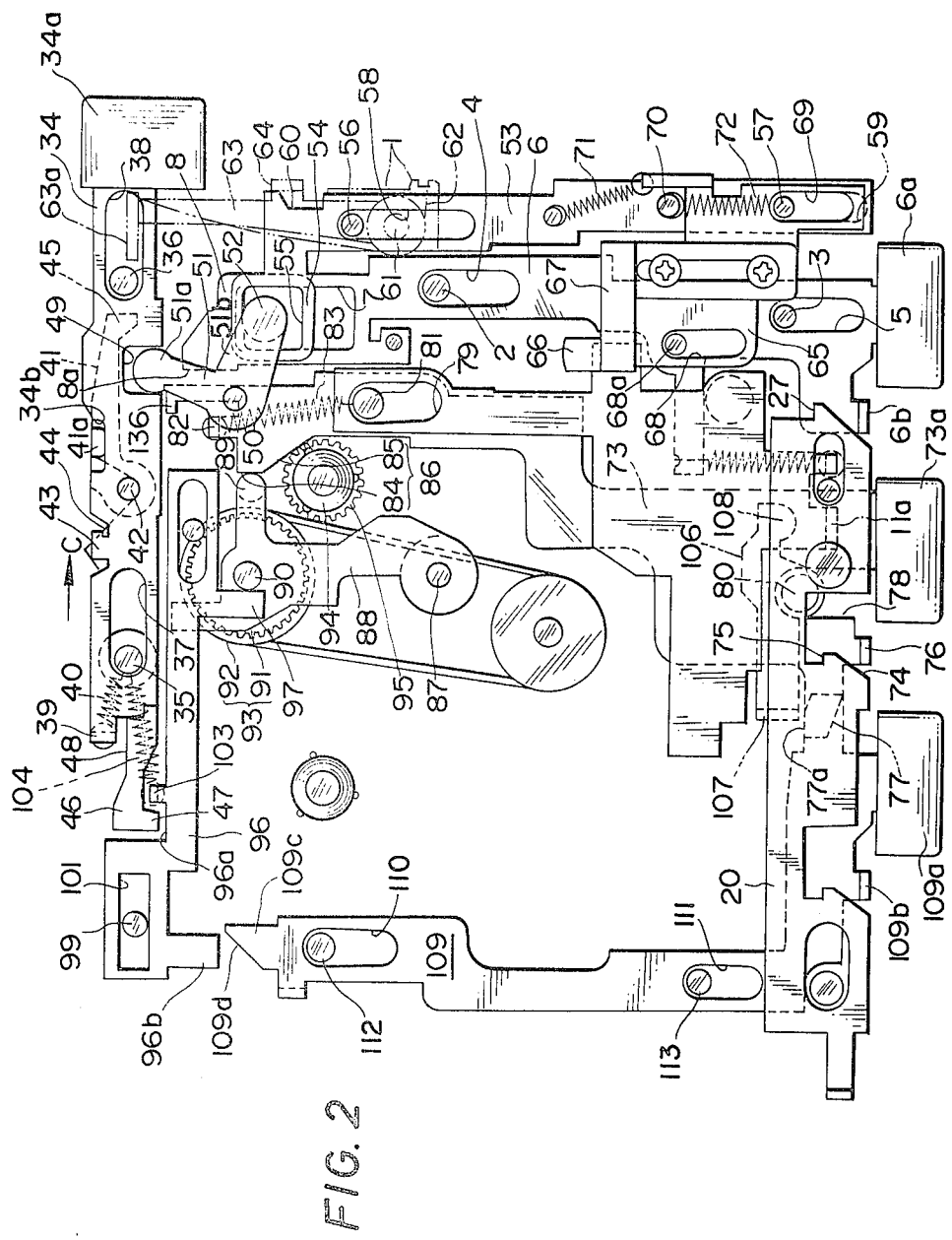
FIG. 2 is a plan view thereof.
Figure 6:
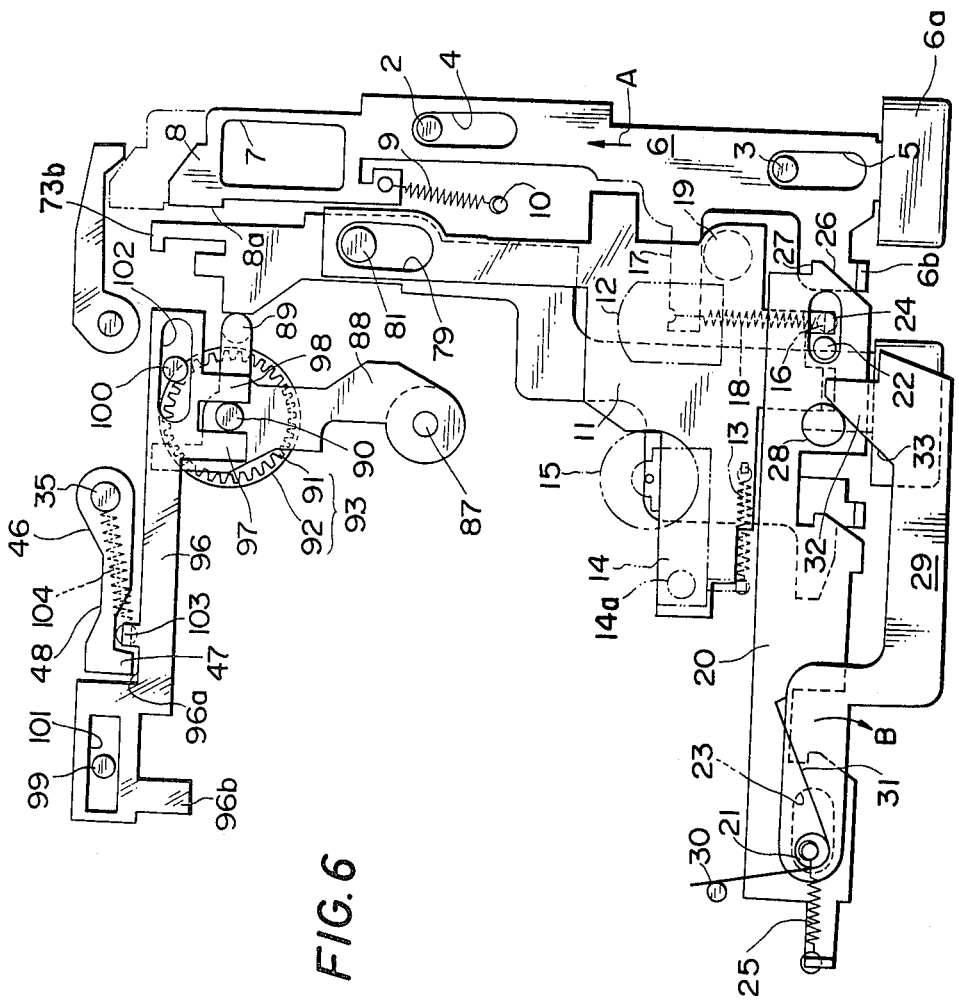
FIG. 6 is a plan view of the principal parts of the operating mechanism of the present invention.

Referring first to FIGS. 1, 2 and 6, there are shown a perspective view and plan views of the principal mechanisms in a recording and reproducing device according to the present invention wherein a chassis plate 1 of the recording and reproducing device is provided having guide pins 2 and 3 extending therefrom. A reproduction actuator lever 6 having elongated slots to receive pins 2 and 3 is positioned on chassis plate 1 so as to allow sliding movement of the reproduction actuator lever 6 back and forth on the underside of chassis plate 1. A reproduction operation button 6a is secured at an end of lever 6 and is depressible to initiate sliding movement of reproduction actuator lever 6. A forward part of reproduction actuator lever 6 adjacent button 6a is bent upwardly to form an erect engaging element 6b and in the rear portion of lever 6 a rectangular slot 7 and an engaging element 8 having an extending segment 8a contiguous to the slot 7 is provided. A coil spring 9 is stretched between the reproduction actuator lever 6 and a pin 10 extending from the chassis plate 1 to urge the lever 6 in the forward position (downwardly as viewed in FIG. 6).

The recording and reproducing device includes a head support plate 11 having mounted thereon a magnetic head 12 for recording and reproduction and a pinch roller 15 carried by a bracket 14 which is urged to rotate about its pin support 14a on plate 11 by a spring 13 extending between bracket 14 and plate 11. A downwardly bent tab 16 is provided at the forward portion of plate 11 and a coil spring 18 is disposed between tab 16 and an elongated protuberance 17 extending from reproduction actuator lever 6 to key the head support plate 11 to the reproduction actuator lever 6. In addition a regulator pin 19 extends from head support plate 11 so as to contact a front edge of the elongated protuberance 17. Thus plate 11 is arranged to move in accordance with the rearward movement (in the direction of arrow A, FIG. 6) of the lever 6.

A lock lever 20 is provided forwardly of head support plate 11. Lock lever 20 includes elongated slots 23, 24 through which extend guide pins 21, 22 extending from chassis plate 1. Thus lock lever 20 is disposed for left to right sliding movement (as viewed in FIG. 6) with respect to chassis plate 1. Normally lock lever 20 is urged to the right (as viewed in FIG. 6) by a coil spring 25 disposed between the left end of lock lever 20 and guide pin 21. The right end of lock lever 20 (as viewed in FIG. 6) is provided with a slant guide face 26 defining a cutout segment 27 and a pin 28 is provided extending from lever 20 to the left of slant guide face 26.

A stop lever 29 is also provided to serve as a stop for movement of lock lever 20. Lever 29 is pivotally mounted on guide pin 21 for swinging movement thereabout in the direction of arrow B. Lock lever 29 is urged for swinging movement by a torsion spring 31 secured at one end of a pin 30 extending from chassis plate 1 and at its other end to a portion of lock lever 29. A projection 32 having a slant face 33 extends from lock lever 29 and slant face 33 is maintained in continuous contact with pin 28 on lock lever 20.

The above-described mechanism of this invention operates in the following manner. When the reproduction operation button 6a is depressed to initiate a reproduction mode for the device, the reproduction actuator lever 6 is moved in the direction of arrow A against the urging of coil spring 9. This results in the head support plate 11 moving in the same direction because of the coupling of head support 11 to actuator lever 6 through the elongated element 17 and coil spring 18. With movement of reproduction actuator 6 the engaging element 6b of lever 6 contacts slant guide face 26 of lock lever 20 and moves along th guide face 26. This movement moves lock lever 20 to the left (as viewed in FIG. 6) against the coil spring 25, and upon reaching the position where engaging element 6b rides over slant face 26 and engages within cutout segment 27. With engaging element now engaged in cutout segment 27 the lock lever 20 returns to the right a slight degree so as to maintain the condition of movement of the head support plate 11. This condition is shown in FIG. 3.

To disengage the device from the reproduction mode, stop lever 29 is operated. When the stop lever 29 is operated in the direction opposite to the direction of arrow B, the slant face 33 of the projection 32 thereof acts against the guide pin 28 moving the pin 28 and lock lever 20 to the left (as viewed in FIG. 6). Consequently, the engaging element 6b is disengaged from the cutout 27 and lever 6 is forced back to its original position under the urging force of the coil spring 9 to take the device out of the reproduction operation mode.

Figure 3:
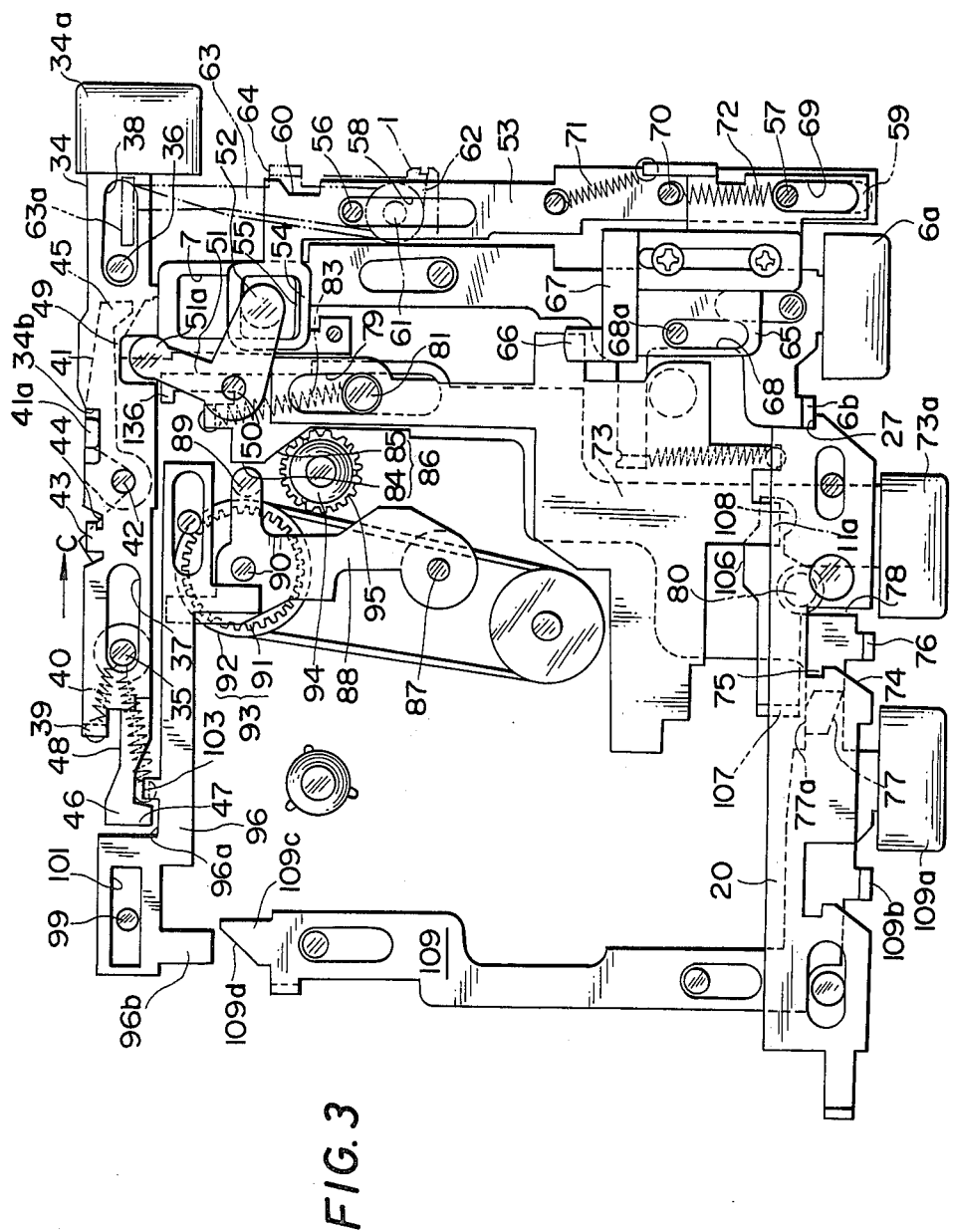
FIG. 3 is a plan view of the operating mechanism in the reproduction mode.
Figure 4:
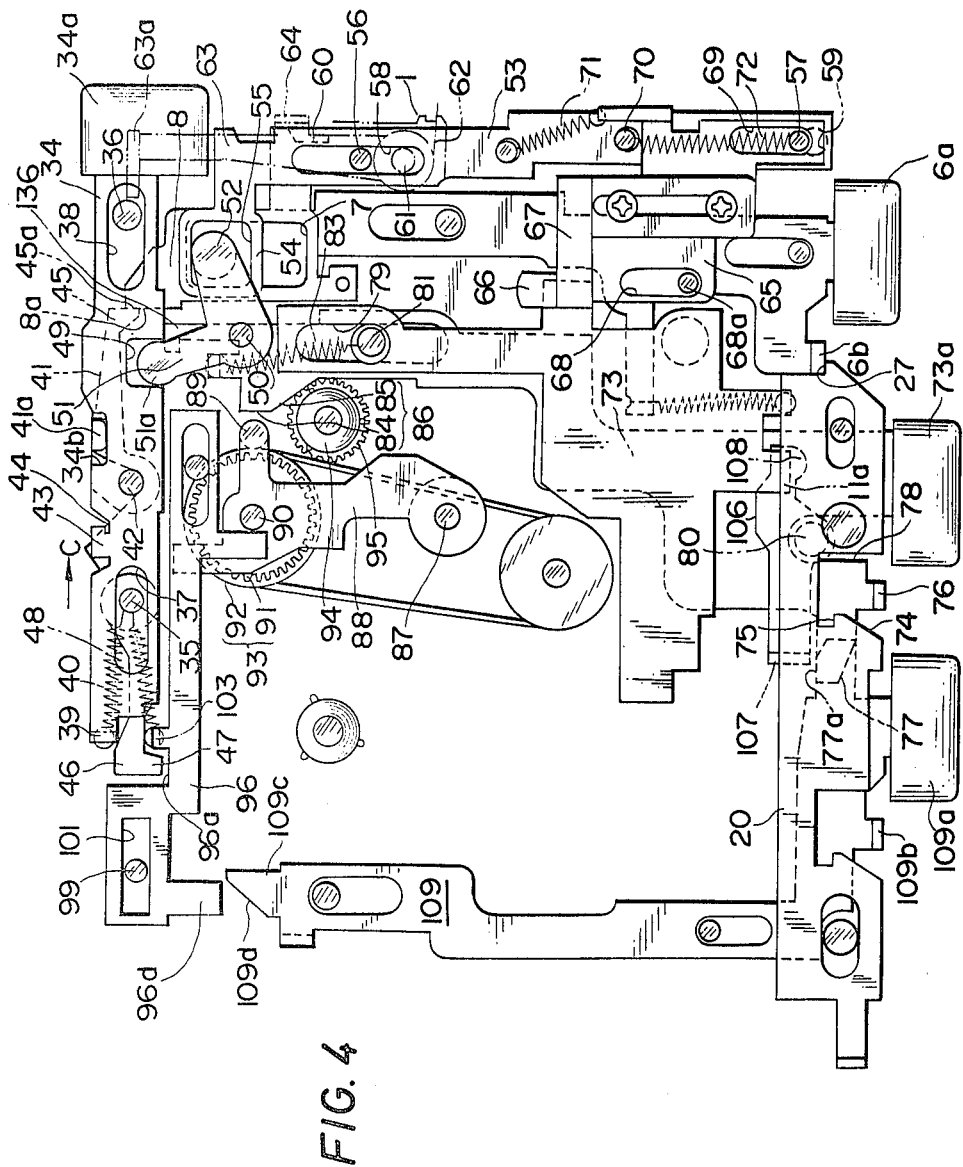
FIG. 4 is a plan view of the operating mechanism in the recording mode.
Figure 5:
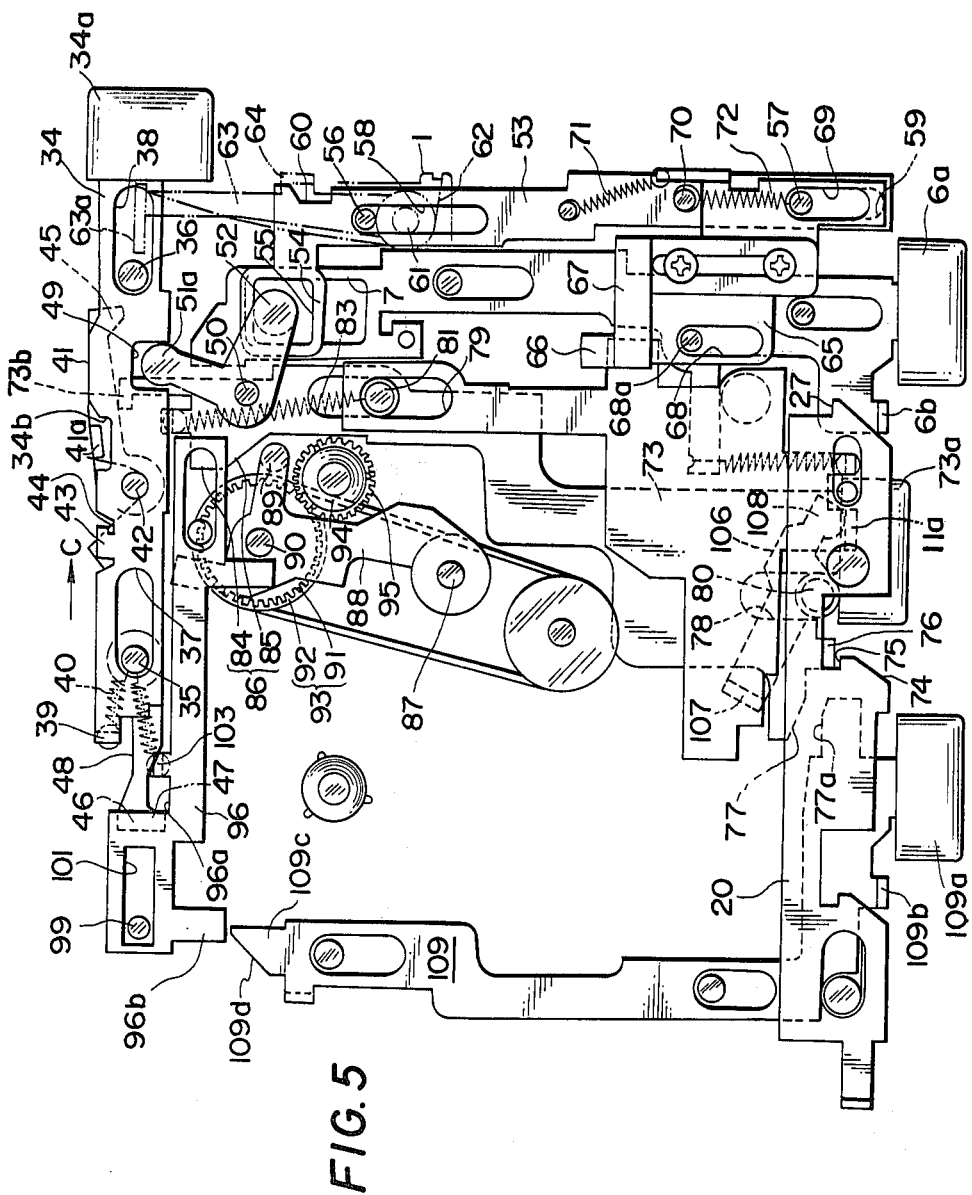
FIG. 5 is a plan view of the operating mechanism in the rewind mode.

Reference is now made to FIGS. 3-5 as well for a description of the recording actuation mode. A recording actuator lever 34 is pivoted having at its right end (as viewed in FIG. 2) a depressible recording operation button 34a. Recording actuator lever 34 is always urged in the direction of arrow C by a coil spring 40 disposed between an erect protuberance 39 at an end of lever 34 and a guide pin 35 extending from chassis plate 1 and is slidable in the right and left directions within the constraints defined by elongated slots 37, 38 formed therein and guide pins 35, 36 extending from chassis plate 1.

A regulator arm 41 is also provided for pivoting swinging movement about a pivot pin 42 extending from recording actuator lever 34. Regulator arm 41 is urged into engagement with a stop cutout segment 34b on lever 34 by a torsion spring 44 fixed between a projection 41a formed on regulator arm 41 and a spring mount segment 43 on lever 34. An end protuberance 45 of regulator arm 41 is provided and is positioned to confront the guide pin 36 extending from chassis plate 1. Another regulator arm 46 is l-osely pivoted about guide pin 35 so as to be swingable thereabout. Regulator arm 46 is provided with a protruding end portion 47 at its free end and a guide cam surface 48 contiguous to the protruding end portion 47.

Recording actuator lever 34 is also provided with a cutout segment 49 in which is loosely fitted an end 51a of an L-shaped lock lever 51 which is rotatably disposed about a pin 50 extending from chassis plate 1. At the other end 51b of lock lever 51 is an extending pin 52 which extends within slot 7 on reproduction actuator lever 6.

An auxiliary recording lever 53 is also provided having a protuberant end portion 54 within which is provided an elongated slot 55. Pin 52 on lock lever 51 is disposed for loose fit within slot 55 of auxiliary recording lever 53. The auxiliary recording lever 53 is disposed to make a limited linear movement within a defined range and includes elongated slots 58, 59 formed therein to receive guide pins 56, 57 extending from the chassis plate 1. At the upper end of auxiliary lever 53 (as viewed in FIG. 2) is formed a cutout 60 arranged to receive a protuberance 64 of an erroneous erase preventing lever 63 which is urged by a torsion spring 62 to turn about a pivot pin 61 extending from the chassis plate 1.

An erase head 66, which may be a permanent magnet, is provided and is secured to its support plate 65 by a bracket 67. The sliding direction of the erase head support plate 65 relative to the chassis plate 1 is regulated by guide pins 56, 57 which are disposed through elongated slots 68, 69 formed in support plate 65. In addition the degree of sliding movement of erase head support plate 65 is defined by a pin 70 extending from auxiliary lever 53 into an elongated slot (not shown) on support plate 65. Erase head support plate 65 is forced rearwardly (upwardly as viewed in FIG. 2) by a coil spring 71 and forwardly by another coil spring 72 stretched between pin 70 on the auxiliary lever 53 and guide pin 57.

The above-described mechanism operates in the following manner. When the recording button 34a is depressed, the recording actuator lever 34 is moved in the direction opposite to the direction of arrow C against the urging of spring 40. However, when a tape cassette is present in the device which is a prerecorded cassette (that is, one not provided with an erroneous erase preventing pawl), the erroneous erase prevention lever 63 is in the condition shown in the drawings and protuberance 64 is urged toward the auxiliary lever 63, so that protuberance 64 enters cutout 60 to prevent movement of the auxiliary recording lever 53. Therefore, even if one attempts to depress the recording actuator lever 34, the sliding motion of the auxiliary lever 53 through lock lever 51 is checked to make it impossible to effect sufficient depression. However, if a tape cassette capable of recording is set in the play position, the bent protuberance 63a formed on the upper end erroneous erase prevention lever 63 is forced to the right by the presence of a tab in the tape cassette and the lever 63 is turned clockwise (as viewed in FIG. 2) about its pivot 61. Therefore, the protuberance 64 is prevented from entering cutout 60, thus allowing free sliding movement of the auxiliary recording lever 53.

In this case, when the recording actuator lever 34 is depressed, the lock lever 51 is turned counterclockwise about its pivot 50 and pin 52 at an end of lever 51 brings the reproduction actuator lever 6 and auxiliary lever 53 into the slots 7, 54, respectively. By this operation, the erase head 66 on its support plate 65 advances to the magnetic tape in the cassette and extending segment 8a on the left side of the protruding portion 8 of the reproduction actuator lever 6 comes into engagement with the protruding portion 45 of regulator arm 41 while the protuberance 6b of actuator lever 6 fits into the cutout 27 of lock lever 20, thereby holding the recording actuator lever 34, reproduction actuator lever 6 and auxiliary recording lever 53 at their operative respective positions. Thus, the recording mode can be brought about readily by the operation of the recording actuator lever 34 alone.

On the other hand, in the initial reproduction condition, the protuberance 6b is engaged in the cutout 27 of the lock lever 20 to keep the lever 6 in its depressed position, so that the slot 7 also moves in the direction of advancement of lever 6. In such a condition of the reproduction mode, when a recordable tape cassette is set in its play position and the recording button 34a is pressed to move the recording actuator lever 34 to the left, the lock lever 51 is forced to turn counter-clockwise, moving the auxiliary lever 53 along in the direction of arrow A, and this condition is maintained thereafter in the manner described above by the engagement of the protruding portion 8 with the corresponding protuberance 45 of regulator arm 41. Thus, successive recordings can be made by operating the recording lever as needed during the reproduction mode.

The recording and reproducing device of the present invention includes a rewind lever 13 which has at its end depressible operating button 73a. Lever 73 includes at its front end a protruding tab 76 and an acting piece 77 arranged to be engaged with and guided by a bevel 74 and a cutout 75, respectively, provided on the lock lever 20. The rewind lever 73 is also provide with a cutout 78 and an elongated slot 79 therein in which guide pins 80 and 81 extending from chassis plate 1 are respectively received to permit direct movement of lever 73. Rewind lever 73 is always urged forwardly (in the direction opposite to th direction of arrow A) by a coil spring 83 stretched between an erect piece 82 at a rear end of the lever and guide pin 81. The rear end of rewind lever 73 terminates in a cam surface 86 having a protruding face 84 and a bevel 85.

A plate 88 swingable about a pivot 87 extending from chassis plate 1 and having a protruding pin 89 is positioned confronting cam surface 86 so as to be contactable therewith. Mounted at an end of swingable plate 88 is a rotator 93 comprising a gear 91 and a pulley 92 and arranged freely rotatable about a pivot 90 on plate 88. Gear 91 is arranged so that it can mesh, when so required, with a gear 95 secured directly to a tape cassette supply reel drive shaft 94. The pivot 90 projects upwardly and is held between two protuberant portions 97, 98 of a slide lever 96. This slide lever 96 is movable linearly along guide pins 99, 100 extending from chassis plate 1 received within elongated slots 101, 102 formed in slide lever 96. Slide lever 96 is normally urged to the right (as viewed in the drawings) by a coil spring 104 stretched between an erect piece 103 on slide lever 96 and pivot pin 35. Slide lever 96 is also so positioned that a cutout 105 formed thereon receives the protruding portion 47 of regulator arm 46.

In operation, when the rewind operation button 73a is depressed, rewind lever 73 is moved and the protuberance 76 is pushed in along the slant of the lock lever 20 to allow the lock lever 20 to move to the left until protuberance 76 fits into the cutout 75 where the rewind condition is maintained. Cam surface 86 is also moved in the same direction causing the protuberance 89 to move along cam surface 86 while swingable plate 88 is formed to turn clockwise about its pivot 87 through the movement of slide lever 96 under the spring force of the coil spring 104. This movement brings gear 91 of rotator 93 into engagement with gear 95 and rotator 93 is driven by the capstan motor to drive the supply reel drive shaft 94 thus effecting rewind of the magnetic tape in the tape cassette. This condition is shown in FIG. 5.

In the above-described mode, when the operating button 73a for the rewind operation is pressed to move rewind lever 73 in the direction of arrow A, the regulator arm 41 having its protruding portion 45 engaged with guide pin 36 is formed by a protruding pawl 73b at the end of lever 73 to rotate counterclockwise about its pivot 42 against the urging of torsion spring 44, thereby releasing the regulator arm 41 from its engaged condition. By this operation, the recording lever 34 only is allowed to return, as it is moved in the direction of arrow C under the urging force of coil spring 40, with the reproduction actuation lever 61 staying at its operative position to maintain the reproduction mode. During this operation, the erase head 66 also recedes and the magnetic tape in a tape cassette in the device is rewound owing to the meshed relationship of the gears. However, since the magnetic head 12 stays at its reproduction position, the magnetic tape review mode is formed. Here, if the rewind lever 73 is strongly depressed, the head support plate 11 is forced to retract, that is, as the rewind lever 73 is moved in the direction of arrow A, the rear edge 77a of the acting piece 77 pushes rearwardly against an upwardly disposed tab 107 of a lever 106 to rotate lever 106 clockwise about guide pin 80 on which it is pivotally mounted while an acting portion 108 of lever 106 pushes a tab projection 11a on head support plate 11 forwardly, that is opposite to the direction of arrow A. Thus, when the rewind lever 73 is operated while the device is in the reproduction mode, the head support plate 11 recedes and the magnetic head 12 and pinch roller 15 move away from the plane of travel of the magnetic tape in a tape cassette. At the same time, gear 91 of rotator 93 is meshed with gear 95 which is integral with the tape supply reel drive shaft thus allowing rewinding of the magnetic tape. In this operation, the rewind lever 73 stays unlocked, so that if the operator's finger hold on the rewind button 73a is released, the magnetic head 12 and magnetic tape to form the reproduction mode. In this case, therefore, the review mode can be attained easily with a single operation.

In the recording mode, the recording actuation lever 34 is moved in the opposite direction of arrow C and its end protuberance presses against the guide cam surface 48 of regulator arm 46 which is swingable about the guide pin 35 pivoting cam surface 48 and regulator arm 46 counterclockwise. Accordingly, the protruding portion 47 of arm 46 fits into a corresponding cutout 96a on the slide lever 96 and a protruding portion 96b of slide lever 96 is brought to the position where it abuts against a cam surface 109d of a protruding end portion 109c at the end of a quick delivery lever 109 to regulate the depressing operation, thereby preventing the recording mode from being directly switched into the quick delivery mode. The quick delivery lever is slidably disposed on chassis plate 1 through elongated slots 110, 111 disposed about guide pins 112, 113 extending from chassis plate 1 and is movable responsive to the depression of quick delivery push button 109a.

It is thus seen that the recording and reproducing device of the present invention provides an operating mode changing assembly which provides simple operating procedures to effect selected mode changes for the device.

What is claimed is:

1. An operating mode changing assembly for a recording and reproducing apparatus comprising:
   a reproduction actuator lever movable from a first inactive position to a second operative position,
   a lock lever for holding said reproduction actuator lever in its said second operative position,
   a recording actuator lever movable from a first inactive position to a second operative position,
   coupling means for operatively coupling said reproduction actuator lever and said recording actuator lever and for moving said reproduction actuator lever from its said first position to its said second position responsive to movement of said recording actuator lever from its said first position to its said second position, and
   means operatively associated with said recording actuator lever to hold said recording actuator lever in its said second position when said reproducing actuator lever is in its said second position.

2. An operating mode changing assembly for a recording and reproducing apparatus according to claim 1 wherein said means operatively associated with said recording actuator lever comprises a spring biased and pivotally mounted lever member carried by said recording actuator lever pivotable from a first position disengaged from said recording actuator lever to a second position in locking engagement with said recording actuator lever as said recording actuator lever moves from its said first position to its said second position.

3. An operating mode changing assembly for a recording and reproducing apparatus according to claim 2 further comprising a rewind actuator lever movable from a first inactive position to a second operative position and wherein said rewind actuator lever when moved to its second operative position engages said spring biased and pivotally mounted lever member to disengage said lever member from engagement with said recording actuator lever to move said recording actuator lever from its said second position to its said first position while said reproducing actuator lever is maintained in its said second position.

4. An operating mode changing assembly for a recording and reproducing apparatus according to claim 1 including a magnetic head member and a pinch roller mounted on a support plate member, said support plate member being movable from a first retracted position to a second operative position to position said magnetic head member and pinch roller in operative position with respect to magnetic tape in said apparatus, said support plate member being operatively associated with said reproduction actuator lever whereby said support plate member is movable from its said first position to its said second position responsive to movement of said reproduction actuator lever from its said first position to its said second position.

* * * * *